(12) United States Patent  
King et al.

(10) Patent No.: US 9,933,107 B2  
(45) Date of Patent: *Apr. 3, 2018

(54) DISPLAY WALL MOUNT

(71) Applicants: Todd S. King, Boscobel, WI (US); Lauren R. King, Boscobel, WI (US); Roger Cameron Love, Show Low, AZ (US)

(72) Inventors: Todd S. King, Boscobel, WI (US); Lauren R. King, Boscobel, WI (US); Roger Cameron Love, Show Low, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,667

(22) Filed: Sep. 23, 2016

(65) Prior Publication Data

US 2017/0089507 A1    Mar. 30, 2017

Related U.S. Application Data

(63) Continuation-in-part of application No. 15/097,567, filed on Apr. 13, 2016, now Pat. No. 9,454,917.

(60) Provisional application No. 62/235,249, filed on Sep. 30, 2015.

(51) Int. Cl.
| | |
|---|---|
| *G09B 23/00* | (2006.01) |
| *F16M 11/12* | (2006.01) |
| *F16M 13/02* | (2006.01) |
| *A47F 5/08* | (2006.01) |
| *A47F 7/00* | (2006.01) |
| *B44C 5/02* | (2006.01) |

(Continued)

(52) U.S. Cl.
CPC ............ *F16M 11/12* (2013.01); *A47F 5/08* (2013.01); *A47F 7/00* (2013.01); *B44C 5/02* (2013.01); *F16C 11/103* (2013.01); *F16M 13/02* (2013.01); *A47F 5/10* (2013.01); *F16M 2200/022* (2013.01)

(58) Field of Classification Search
USPC ..... 434/295, 296, 365, 419, 420; 248/122.1, 248/274.1, 276.1, 278.1, 288.31, 454, 248/476, 495
See application file for complete search history.

(56) References Cited

U.S. PATENT DOCUMENTS 4,225,106 A * 9/1980 Eplan ..................... A45D 20/12  
219/242  
4,453,695 A * 6/1984 Sennott .................. A45D 20/12  
248/278.1

(Continued)

*Primary Examiner* — Kurt Fernstrom  
(74) *Attorney, Agent, or Firm* — Kenneth L. Green; Averill & Green

(57) ABSTRACT

A display mount includes roll, yaw, and pitch adjustments to precisely position the display. A wall mount is secured to a room wall. A roll axis is provided by a first vertical plate pivotally engaging a horizontal stud held by the wall mount. A first horizontal plate is fixed to the first vertical plate. A yaw axis is provided by a vertical stud pivotally attaching a second horizontal plate to the first horizontal plate. A second vertical plate is fixed to the second horizontal plate. A pitch axis is provided by a second horizontal stud pivotally attaching a third vertical plate to the second vertical plate. The third vertical plate includes a display engaging clamp or mount. Cork clutch disks residing between pivoting surfaces provide a clutching function retaining hand adjustments.

18 Claims, 6 Drawing Sheets

(51) Int. Cl.
 *F16C 11/10* (2006.01)
 *A47F 5/10* (2006.01)

(56) References Cited

U.S. PATENT DOCUMENTS

| | | | | |
|---|---|---|---|---|
| 4,971,865 A * | 11/1990 | Nowlan | ................... | B44C 5/02 |
| | | | | 248/295.11 |
| 5,779,294 A * | 7/1998 | Magri | ...................... | B44C 5/02 |
| | | | | 248/496 |
| 5,842,672 A * | 12/1998 | Sweere | ................. | A47B 21/00 |
| | | | | 248/278.1 |
| 6,554,238 B1 * | 4/2003 | Hibberd | ............... | A47B 81/061 |
| | | | | 248/278.1 |
| 6,561,468 B2 * | 5/2003 | Williamson | .......... | A47F 5/0807 |
| | | | | 248/146 |
| 6,828,035 B1 * | 12/2004 | Goettl | ...................... | B44C 5/02 |
| | | | | 211/103 |
| 7,207,535 B1 * | 4/2007 | Giuliani | ............... | A01M 31/06 |
| | | | | 248/216.1 |
| 7,780,131 B2 * | 8/2010 | Oh | ........................ | F16M 11/10 |
| | | | | 248/276.1 |
| 7,793,903 B2 * | 9/2010 | Dittmer | ............... | F16M 11/048 |
| | | | | 248/276.1 |
| 7,823,847 B2 * | 11/2010 | Bremmon | ............. | F16M 11/10 |
| | | | | 248/201 |
| 8,103,155 B2 * | 1/2012 | Dannenberg | ........... | A45D 20/12 |
| | | | | 392/379 |
| 8,910,804 B2 * | 12/2014 | Kim | .................... | F16M 11/045 |
| | | | | 211/87.01 |
| 9,140,405 B2 * | 9/2015 | Prince | ..................... | F16M 11/14 |
| 9,277,812 B2 * | 3/2016 | Bennett | .................. | A47B 81/00 |
| 2010/0039762 A1 * | 2/2010 | Watson | ................. | G06F 1/1632 |
| | | | | 361/679.21 |

* cited by examiner

DISPLAY WALL MOUNT

CROSS-REFERENCE TO RELATED APPLICATIONS

The present application claims the priority of U.S. Provisional Patent Application Ser. No. 62/235,249 filed Sep. 30, 2015, and U.S. patent application Ser. No. 15/097,567 filed Apr. 13, 2016 which applications are incorporated in their entirety herein by reference.

BACKGROUND OF THE INVENTION

The present invention relates to display mounts and in particular to a trophy skull or plaque mount with three positioning controlled pressure adjustments.

Known wall mounts provide limited position adjustment of the trophy. A trophy skull and other displays have a unique appearance and require a very specific positioning to provide a desired effect on a viewer.

BRIEF SUMMARY OF THE INVENTION

The present invention addresses the above and other needs by providing a display mount which includes roll, yaw, and pitch adjustments to precisely position the display. A wall mount is secured to a room wall. A roll axis is provided by a first vertical plate pivotally engaging a horizontal stud held by the wall mount. A first horizontal plate is fixed to the first vertical plate. A yaw axis is provided by a vertical stud pivotally attaching a second horizontal plate to the first horizontal plate. A second vertical plate is fixed to the second horizontal plate. A pitch axis is provided by a second horizontal stud pivotally attaching a third vertical plate to the second vertical plate. The third vertical plate includes a display engaging clamp or mount. Cork clutch disks residing between pivoting surfaces provide a clutching function retaining hand adjustments.

In accordance with one aspect of the invention, there is provided a trophy mount having three independent axes for positioning. The three axes allow the trophy to be positioned precisely for display providing a desired appearance.

In accordance with one aspect of the invention, there is provided a trophy mount having a skull engaging clamp. A domed post enters the base of the skull through the spinal cord opening and cooperates with a jaw.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the term "generally" is associated with an element of the invention, it is intended to describe a feature's appearance to the human eye, and not a precise measurement.

A longitudinal dimension refers to out of the wall and a lateral dimension refers to parallel to the wall. Directions refer to the centerlines of elements before elements of the trophy mount are rotated.

Figure 1A:
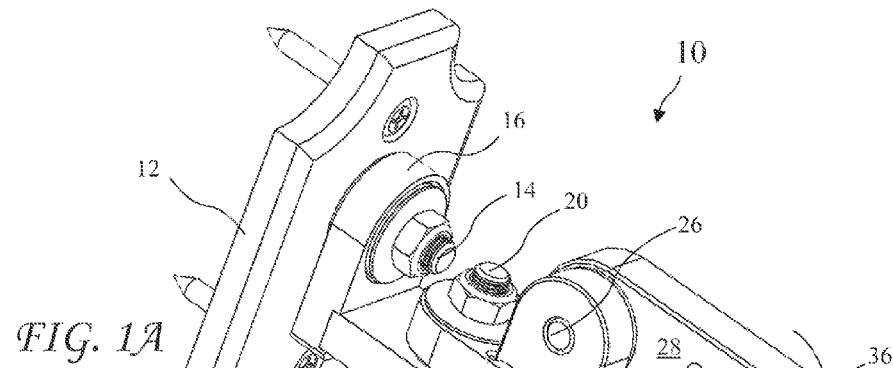
FIG. 1A is a perspective view of a display mount according to the present invention with the mount in a forward position and pitched down.
Figure 1B:
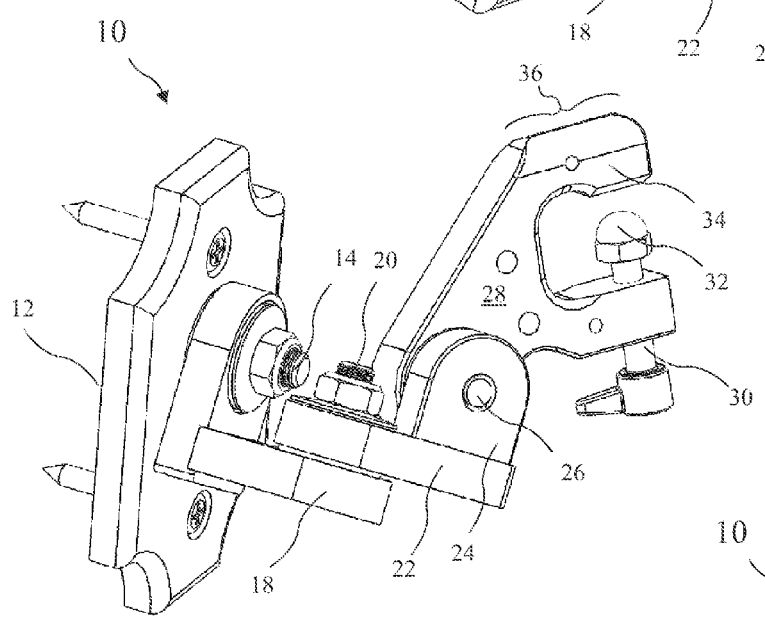
FIG. 1B is a perspective view of the display mount according to the present invention with the mount turned to the right and pitched up.
Figure 1C:
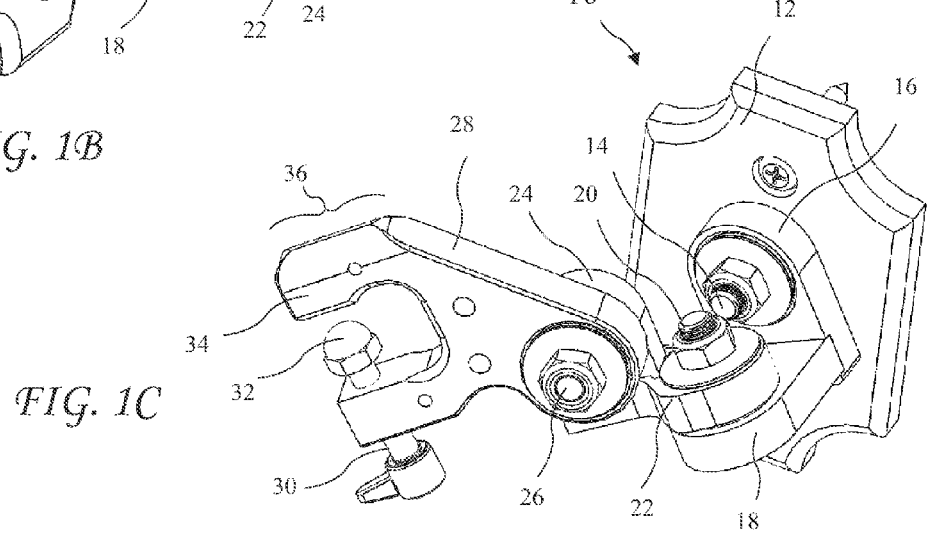
FIG. 1C is a perspective view of the display mount according to the present invention with the mount turned to the left and pitched forward.

A perspective view of a display mount 10 according to the present invention with the mount in a forward position and pitched down is shown in FIG. 1A, a perspective view of the display mount 10 with the mount turned to the right and pitched up is shown in FIG. 1B, and a perspective view of the display mount 10 with the mount turned to the left and pitched forward is shown in FIG. 1C. The display mount 10 includes a wall mount 12 secured to a room wall.

A generally horizontal roll axis 14' is provided by a generally vertical first vertical plate 16 pivotally engaging a generally horizontal longitudinally extending horizontal stud 14 held by the wall mount 12. When the wall mount 12 is attached to a surface which is not vertical, the roll axis is tilted accordingly. A first horizontal plate 18 may be fixed to the first vertical plate 16 or the first horizontal plate 18 and first vertical plate 16 may be a single piece.

A generally vertical yaw axis 20' is provided by a generally vertical, vertical stud 20 pivotally attaching a second horizontal plate 22 to the first horizontal plate 18. When the first vertical plate 16 is rotated, the yaw axis is rotated away from vertical accordingly.

A second vertical plate 24 is fixed to the second horizontal plate 22. A generally horizontal pitch axis 26' is provided by a laterally extending generally horizontal second horizontal stud 26 pivotally attaching a third vertical 28 plate to the second vertical plate 24. When the first vertical plate is rotated about the horizontal stud 14 and/or the second horizontal plate 22 is rotated about the vertical stud 20, the pitch axis is rotated away from horizontal accordingly.

The third vertical plate 28 includes a display attachment comprising a skull engaging clamp 36 comprising a clamp bolt 30 having a domed cap 32 and a mating jaw portion 34. Clutch disks residing between pivoting surfaces allow retained adjusting by hand. The clutch disks are preferably neoprene impregnated cork or a similar material. The studs 14, 20, and 26 provide three axes of rotation allowing positioning of a trophy or other display.

Figure 2:
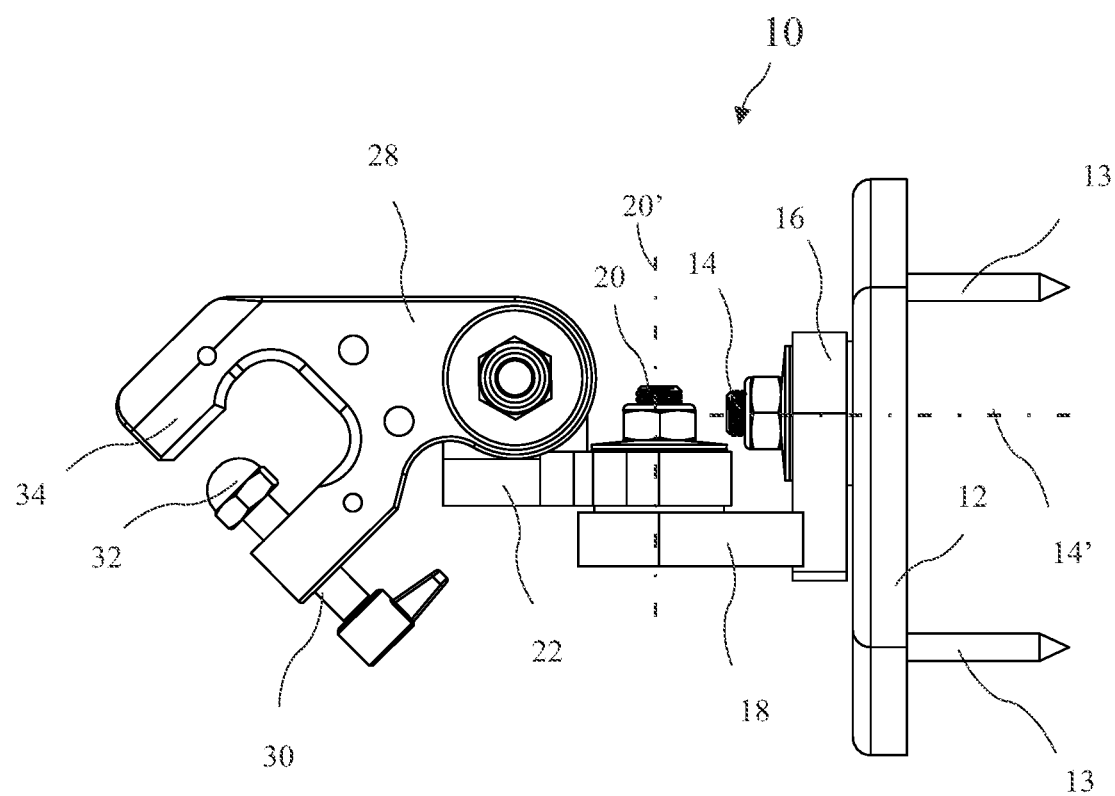
FIG. 2 is a side view of the display mount according to the present invention with the mount turned forward and pitched down.

A side view of a display mount 10 with the mount turned forward and pitched down is shown in FIG. 2. The clamp bolt 30 and domed cap 32 are configured to fit into a spinal cord opening in the base of a skull trophy. The mating jaw 34 enters the rear of the skull, and the clamp bolt is tightened to hold the skull in the mount 10.

Figure 3A:
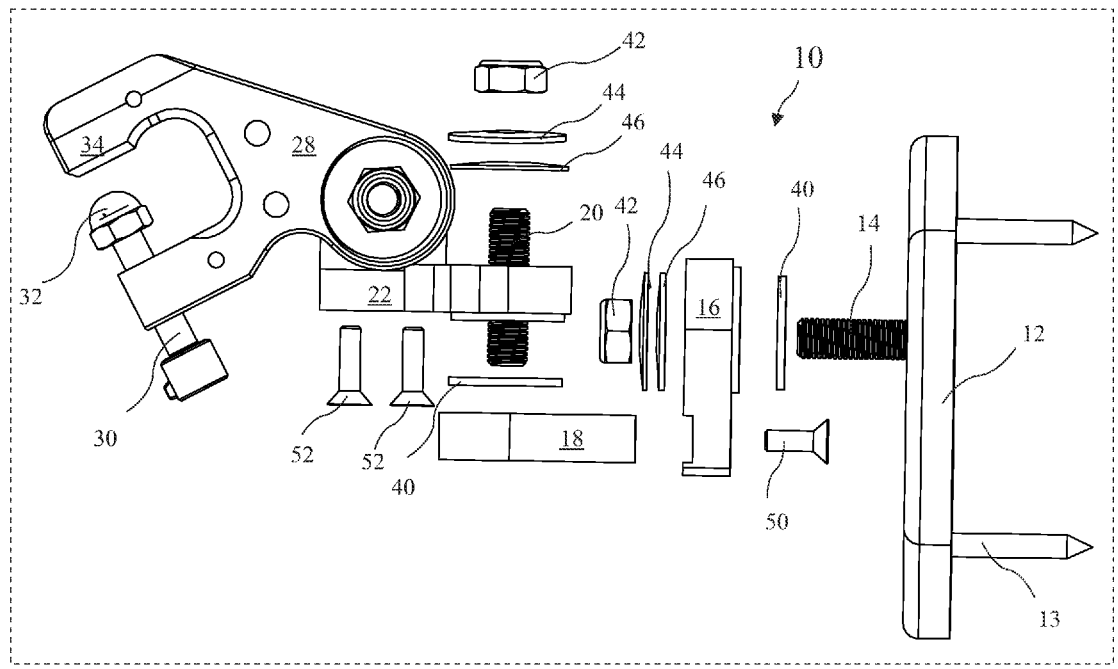
FIG. 3A is a side exploded view of the display mount according to the present invention.
Figure 3B:
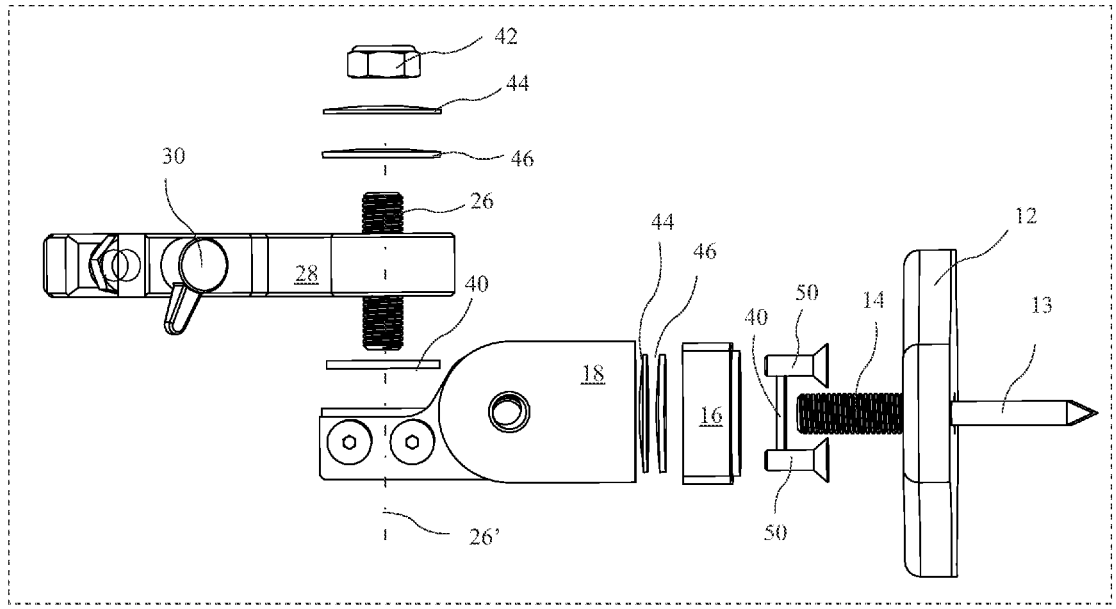
FIG. 3B is a top exploded view of the display mount according to the present invention.

A side exploded view of a display mount is shown in FIG. 3A and a top exploded view of a display mount 10 is shown in FIG. 3B. Locknuts 42, and preferably nylock nuts, are threaded onto the studs 14, 20, and 26 to assemble the mount 10. Clutch disks 40 reside over the studs 14, 20, and 26 and between the wall mount 12 and first vertical plate 16, between the first horizontal plate 18 and the second horizontal plate 22, and between the second vertical plate 24 and the third vertical plate 28 to provide for both slipping of the plates for adjustment and retention of the plates after adjustment. The clutch disks are preferably cork disks or the like, are more preferably neoprene impregnated cork. Belleville disk spring 44 and 46 reside under the lock nuts 42 providing pressure to each pivoting axis.

The first horizontal plate 18 is preferably fixed to the first vertical plate 16 by two screws 50, but the plates 16 and 18 may be a single piece, for example, a single cast piece. The screws 50 are preferably 8-23 flat head screws. The second horizontal plate 22 is preferably attached to the second vertical plate 24 by two screws 52, but the plates 22 and 24 may be a single piece, for example, a single cast piece. The screws 52 are preferably 8-32 flat head screws and more preferably socket countersunk head cap screws.

Figure 4:
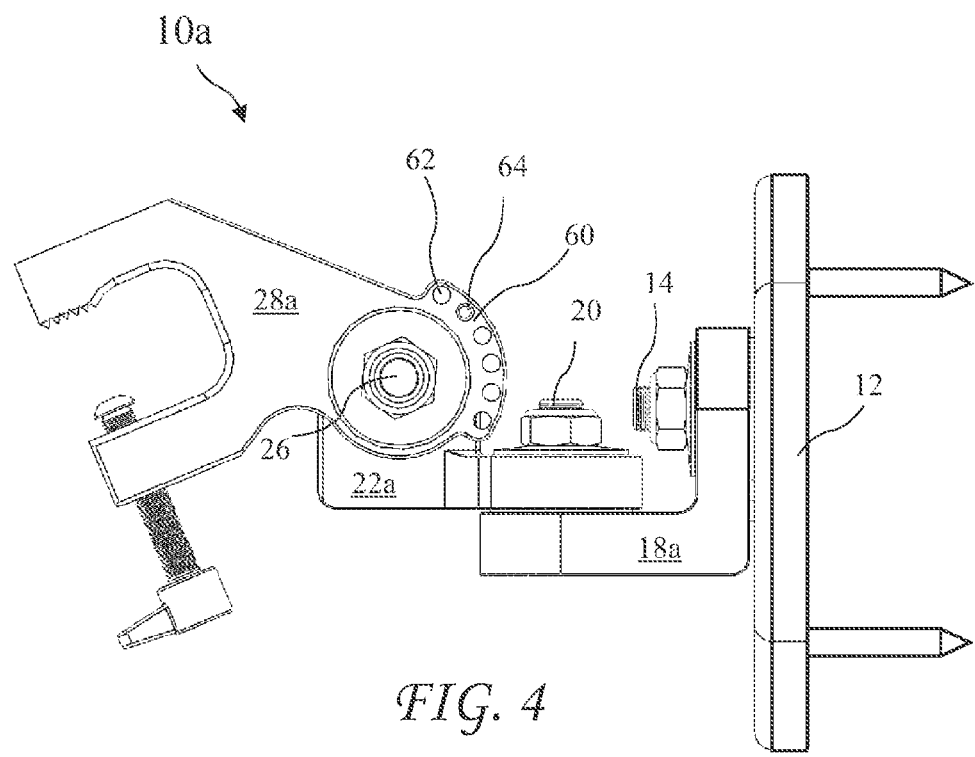
FIG. 4 shows a side view of a display mount including elevation indexing according to the present invention.
Figure 5:
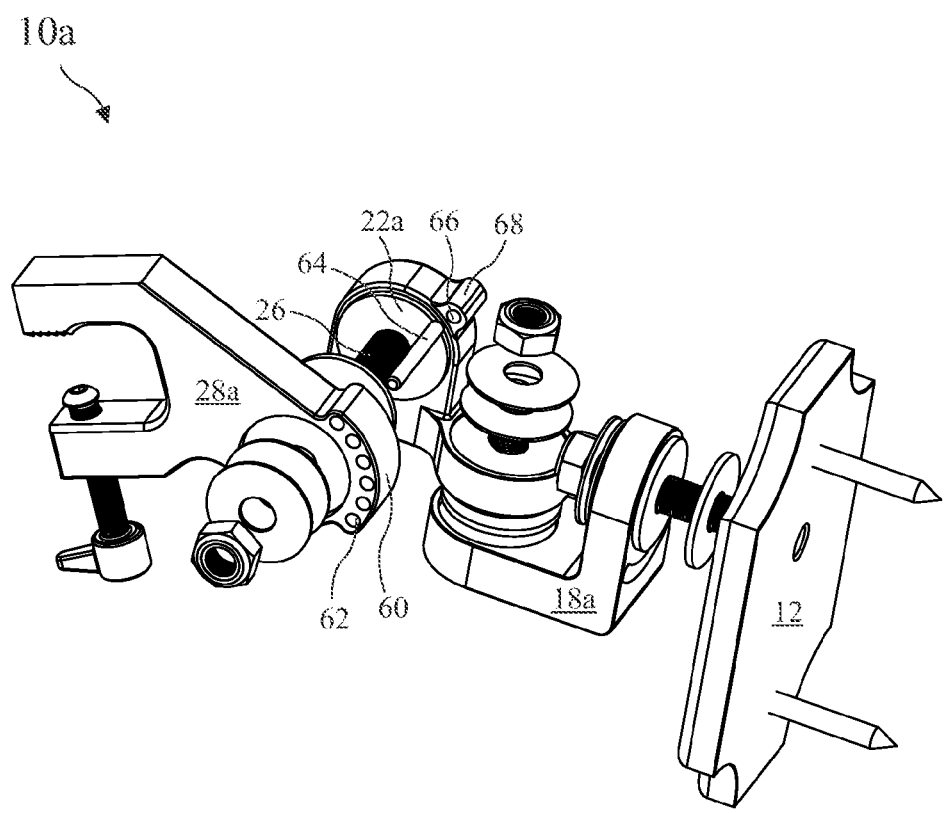
FIG. 5 shows an exploded view of the display mount including elevation indexing according to the present invention.

A side view of a display mount 10a including elevation indexing is shown in FIG. 4 and an exploded view of the display mount 10a is shown in FIG. 5. The display mount 10a includes a third vertical plate 28a having an ear 60 extending radially over a portion of a second vertical plate 24a (see FIGS. 7 and 8) extending angularly for about 110 degrees. The ear 60 includes a multiplicity of first passages 62, for example, about five passages angularly spaced apart, co-axial with the second horizontal stud 26 at the same radius from the second horizontal stud 26. The second horizontal plate 22a includes a tab 68 extending radially from the plate 22a and having at least one second passage 66 co-axial with the second horizontal stud 26 at the same radius from the second horizontal stud 26 as the first passages 62. The third vertical plate 28a may be rotated to align one of the first passages 62 with the second passage 66 and a pin 64 inserted into both aligned passages 62 and 66 to prevent the plate 28a from drifting in pitch when the plate 28a carries a heavy display.

Figure 6A:
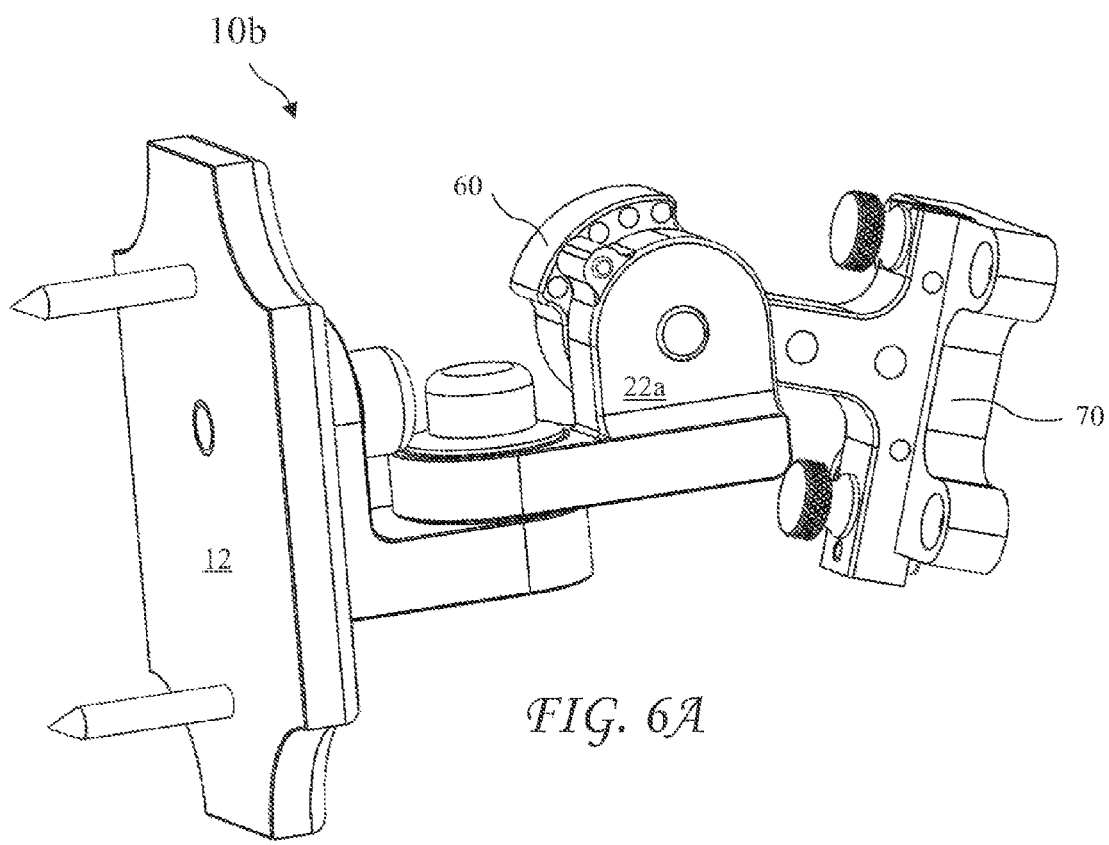
FIG. 6A shows a left side isometric view of the display mount including elevation indexing according to the present invention.
Figure 6B:
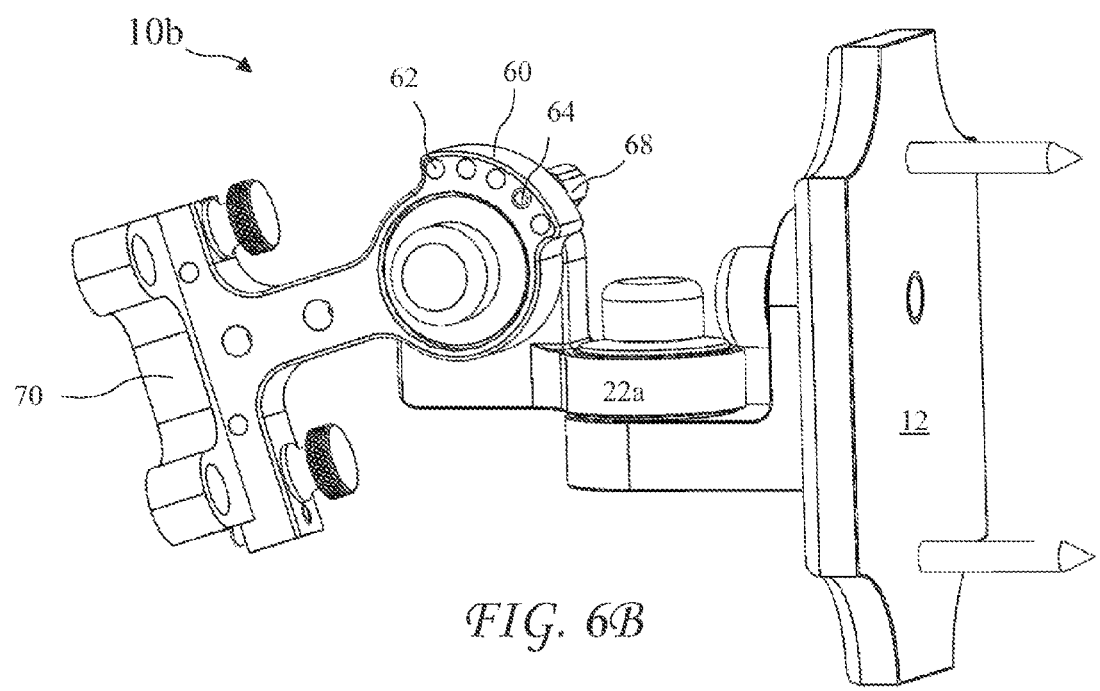
FIG. 6B shows a right side isometric view of the display mount including elevation indexing according to the present invention.

A left side isometric view of the display mount 10b including a plaque mount 70 is shown in FIG. 6A and a right side isometric view of the display mount 10b including the plaque mount 70. The display mount 10b is similar to the display mount 10a, except the plaque mount 70 replaces the third vertical plate 28a.

Figure 7:
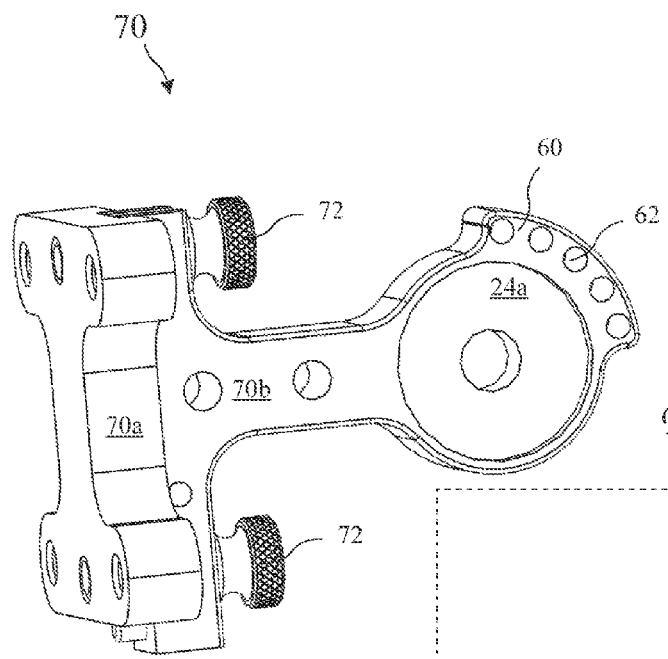
FIG. 7 shows a right side isometric view of a plaque holder of the display mount including elevation indexing according to the present invention.
Figure 8:
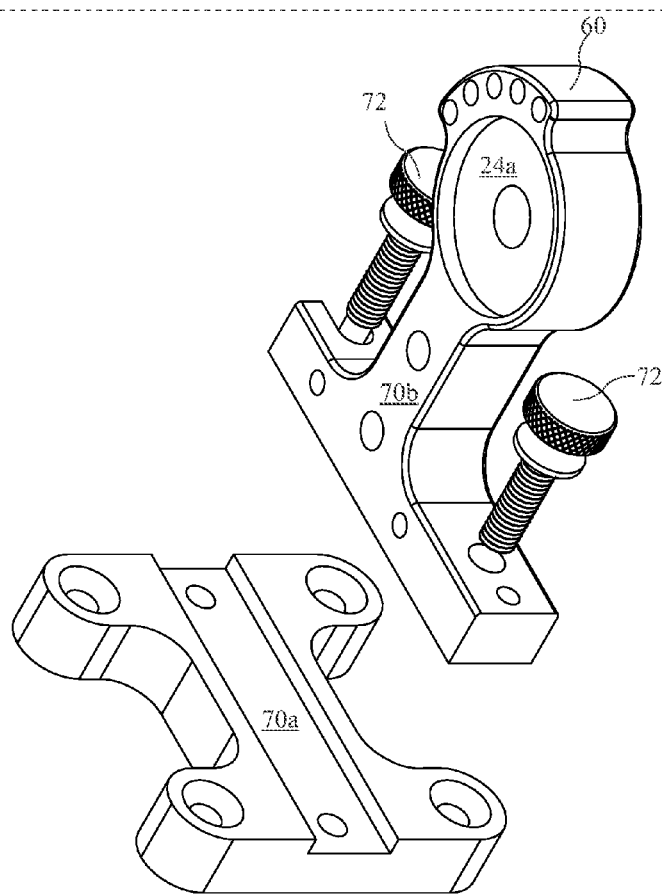
FIG. 8 shows an exploded view of the plaque holder of the display mount including elevation indexing according to the present invention.

A right side isometric view of a plaque holder 70 is shown in FIG. 7 and an exploded view of the plaque holder 70 is shown in FIG. 8. The plaque holder 70 may be single or multi-piece having a plaque portion 70a and a vertical plate portion 70b attached by fasteners 72, for example, threaded fasteners. The vertical plate portion 70b includes the second vertical plate 24a and the ear 60.

The display mount is preferably made from an aluminum zinc alloy, but may be made from any suitable material.

While the invention herein disclosed has been described by means of specific embodiments and applications thereof, numerous modifications and variations could be made thereto by those skilled in the art without departing from the scope of the invention set forth in the claims.

We claim:

1. A three axis display mount comprising:
   a wall mount configured for attaching to a wall;
   a first horizontal stud extending longitudinally out generally horizontally from the wall mount and providing a generally horizontally roll axis;
   a first vertical portion of a first plate pivotally residing on the first horizontal stud;
   a vertical stud extending generally vertically up from a first horizontal portion of the first plate and providing a generally vertical yaw axis;
   a second generally horizontal portion of a second plate pivotally residing on the vertical stud;
   a second horizontal stud extending laterally and generally horizontally from a second generally vertical portion of the second plate and providing a pitch axis;
   a third vertical plate pivotally residing on the second horizontal stud, the third vertical plate cooperating with the second horizontal stud to index the third vertical plate to one of a multiplicity of angles; and
   a display attachment carried by the third vertical plate configured for attaching a display to the display mount.

2. The display mount of claim 1, wherein the display attachment comprises a clamp for attaching a trophy to the display mount.

3. The display mount of claim 1, wherein the clamp defines a jaw for grasping a skull trophy.

4. The display mount of claim 1, wherein the display attachment comprises a plaque mount for attaching a plaque to the trophy mount.

5. The display mount of claim 4, wherein the plaque mount cooperates with four screws to attach a plaque.

6. The display mount of claim 1, wherein a third clutch disk resides over the second horizontal stud between the second generally vertical portion of the second plate and the third vertical plate.

7. The display mount of claim 6, wherein:
   a first clutch disk resides over the first horizontal stud between the wall mount and the first vertical portion of the first plate; and
   a second clutch disk resides over the vertical stud between the second generally horizontal portion of the second plate and the first horizontal portion of the first plate.

8. The display mount of claim 7, wherein the third clutch disk has a greater diameter than the first and second clutch disks.

9. The display mount of claim 1, wherein the first and second clutch disks are about one inch in diameter and the third clutch disk is about 1⅜ inches in diameter.

10. The display mount of claim 7, wherein the clutch disks are made of cork.

11. The display mount of claim 7, wherein the clutch disks are made of neoprene impregnated cork.

12. The display mount of claim 1, wherein the first plate is a single piece casting.

13. The display mount of claim 1, wherein the first plate comprises a first vertical portion attached to a first horizontal portion.

14. The display mount of claim 1, wherein the second plate is a single piece casting.

15. The display mount of claim 1, wherein the second plate comprises a second horizontal portion attached to a second vertical portion.

16. The display mount of claim 1, wherein the cooperation of the third vertical plate with the second horizontal stud to index the third vertical plate to one of a multiplicity of angles, comprises a series of first passages in one of:
    the second generally vertical portion of the second plate; and
    the third vertical plate, and
    at least one second passage in the other one of:
    the second generally vertical portion of the second plate; and
    the third vertical plate,
    the first series of passages and the second passage co-axial with the second horizontal stud and at the same radius from the second horizontal stud, and alignable to insert a rod to fix the pitch of the display mount.

17. A three axis display mount comprising:
    a wall mount configured for attaching to a wall;
    a first horizontal stud extending longitudinally out generally horizontally from the wall mount and providing a generally horizontally roll axis;
    a first vertical portion of a first plate pivotally residing on the first horizontal stud;
    a first clutch disk made of neoprene impregnated cork residing over the first horizontal stud between the wall mount and the first vertical portion of the first plate;
    a vertical stud extending generally vertically up from a first horizontal portion of the first plate and providing a generally vertical yaw axis;
    a second generally horizontal portion of a second plate pivotally residing on the vertical stud;
    a second clutch disk made of neoprene impregnated cork residing over the vertical stud between the second generally horizontal portion of the second plate and the first horizontal portion of the first plate;
    a second horizontal stud extending laterally and generally horizontally from a second generally vertical portion of the second plate and providing a pitch axis;
    a third vertical plate pivotally residing on the second horizontal stud, the third vertical plate cooperating with the second horizontal stud to index the third vertical plate to one of a multiplicity of angles;
    a third clutch disk made of neoprene impregnated cork residing over the second horizontal stud between the second generally vertical portion of the second plate and the third vertical plate; and
    a display attachment carried by the third vertical plate configured for attaching a display to the display mount.

18. A three axis display mount comprising:
    a wall mount configured for attaching to a wall;
    a first horizontal stud extending longitudinally out generally horizontally from the wall mount and providing a generally horizontally roll axis;
    a first vertical portion of a first plate pivotally residing on the first horizontal stud;
    a first clutch disk one inch in diameter and made of neoprene impregnated cork residing over the first horizontal stud between the wall mount and the first vertical portion of the first plate;
    a vertical stud extending generally vertically up from a first horizontal portion of the first plate and providing a generally vertical yaw axis;
    a second generally horizontal portion of a second plate pivotally residing on the vertical stud;
    a second disk one inch in diameter and made of neoprene impregnated cork residing over the vertical stud between the second generally horizontal portion of the second plate and the first horizontal portion of the first plate;
    a second horizontal stud extending laterally and generally horizontally from a second generally vertical portion of the second plate and providing a pitch axis;
    a third vertical plate pivotally residing on the second horizontal stud, the third vertical plate cooperating with the second horizontal stud to index the third vertical plate to one of a multiplicity of angles;
    a third clutch disk 1 3/8 inches in diameter and made of neoprene impregnated cork residing over the second horizontal stud between the second generally vertical portion of the second plate and the third vertical plate; and
    a display attachment carried by the third vertical plate configured for attaching a display to the display mount.

* * * * *